(12) United States Patent
Zucker et al.

(10) Patent No.: US 9,069,393 B2
(45) Date of Patent: *Jun. 30, 2015

(54) COMPUTER MOUSE SLEEVE

(75) Inventors: David Zucker, Seattle, WA (US); Young Soo Kim, Bellevue, WA (US); Steve Klein, Bothell, WA (US); Jeffrey James Heinz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 679 days.

This patent is subject to a terminal disclaimer.

(21) Appl. No.: 12/819,004

(22) Filed: Jun. 18, 2010

(65) Prior Publication Data

US 2011/0310016 A1 Dec. 22, 2011

(51) Int. Cl.
*G09G 5/08* (2006.01)
*G06F 3/0354* (2013.01)

(52) U.S. Cl.
CPC .................................. *G06F 3/03543* (2013.01)

(58) Field of Classification Search
USPC ......................................... 345/163; 15/245.1
See application file for complete search history.

(56) References Cited

U.S. PATENT DOCUMENTS

| | | | | |
|---|---|---|---|---|
| 5,850,664 A * | 12/1998 | Forsline | ...................... | 15/245.1 |
| 5,907,318 A | 5/1999 | Medina | | |
| 6,308,371 B1 * | 10/2001 | Forsline | ...................... | 15/245.1 |
| 6,336,614 B1 | 1/2002 | Kwitek | | |
| 6,417,843 B1 | 7/2002 | Stephens et al. | | |
| 6,933,925 B1 * | 8/2005 | Gibbons et al. | ............... | 345/163 |
| 7,724,238 B2 * | 5/2010 | Daniel et al. | ................... | 345/163 |
| 7,764,270 B2 * | 7/2010 | Shigeno et al. | ............... | 345/163 |
| 2004/0080493 A1 | 4/2004 | Kenin | | |
| 2006/0022943 A1 | 2/2006 | Johnson et al. | | |
| 2006/0176277 A1 | 8/2006 | Daniel et al. | | |
| 2009/0162596 A1 | 6/2009 | Rios et al. | | |

FOREIGN PATENT DOCUMENTS

| | | |
|---|---|---|
| CN | 1336841 A | 2/2002 |
| CN | 2546943 Y | 4/2003 |

(Continued)

OTHER PUBLICATIONS

"Flexible Silicone Rubber Sleeve", Retrirved at << http://www.gammaelectronics.net/pdf/SIL-200.pdf >>, Retrieved Date: Apr. 19, 2010, pp. 2.

(Continued)

*Primary Examiner* — Fred Tzeng
(74) *Attorney, Agent, or Firm* — Jeremy Snodgrass; Judy Yee; Micky Minhas

(57) ABSTRACT

A flexible sleeve includes a first flexible sheet of a first hardness. The first flexible sheet has a first perimeter including a first lip edge and a first pocket edge. The flexible sleeve also includes a second flexible sheet of a second hardness, different than the first hardness. The second flexible sheet has a second perimeter including a second lip edge and a second pocket edge. The second pocket edge is joined to the first pocket edge, and the second lip edge is free from the first lip edge so that the first flexible sheet and the second flexible sheet collectively form a pocket having a mouth defined by the first lip edge and the second lip edge. The flexible sleeve further includes a connector joined to the mouth and configured to mate the mouth to a head of a device while the pocket substantially covers a tail of the device.

20 Claims, 4 Drawing Sheets

(56) References Cited

FOREIGN PATENT DOCUMENTS

| | | |
|---|---|---|
| KR | 1020040021280 A | 3/2004 |
| KR | 1020060116145 A | 11/2006 |

OTHER PUBLICATIONS

"Slip-Proof Silicon Sleeve for Wii Remote Controller (Black)", Retrirved at << http://www.pacificgeek.com/product.asp?c=225&s=1301&ID=49076&P=F >>, Retrieved Date: Apr. 19, 2010, pp. 2.

"International Search Report", Mailed Date: Feb. 17, 2012, Application No. PCT/US2011/039290, Filed Date: Jun. 6, 2011, pp. 8.

State Intellectual Property Office of China, First Office Action and Search Report issued in Chinese Patent Application No. 201180030092.2, Dec. 22, 2014, 12 pages.

\* cited by examiner

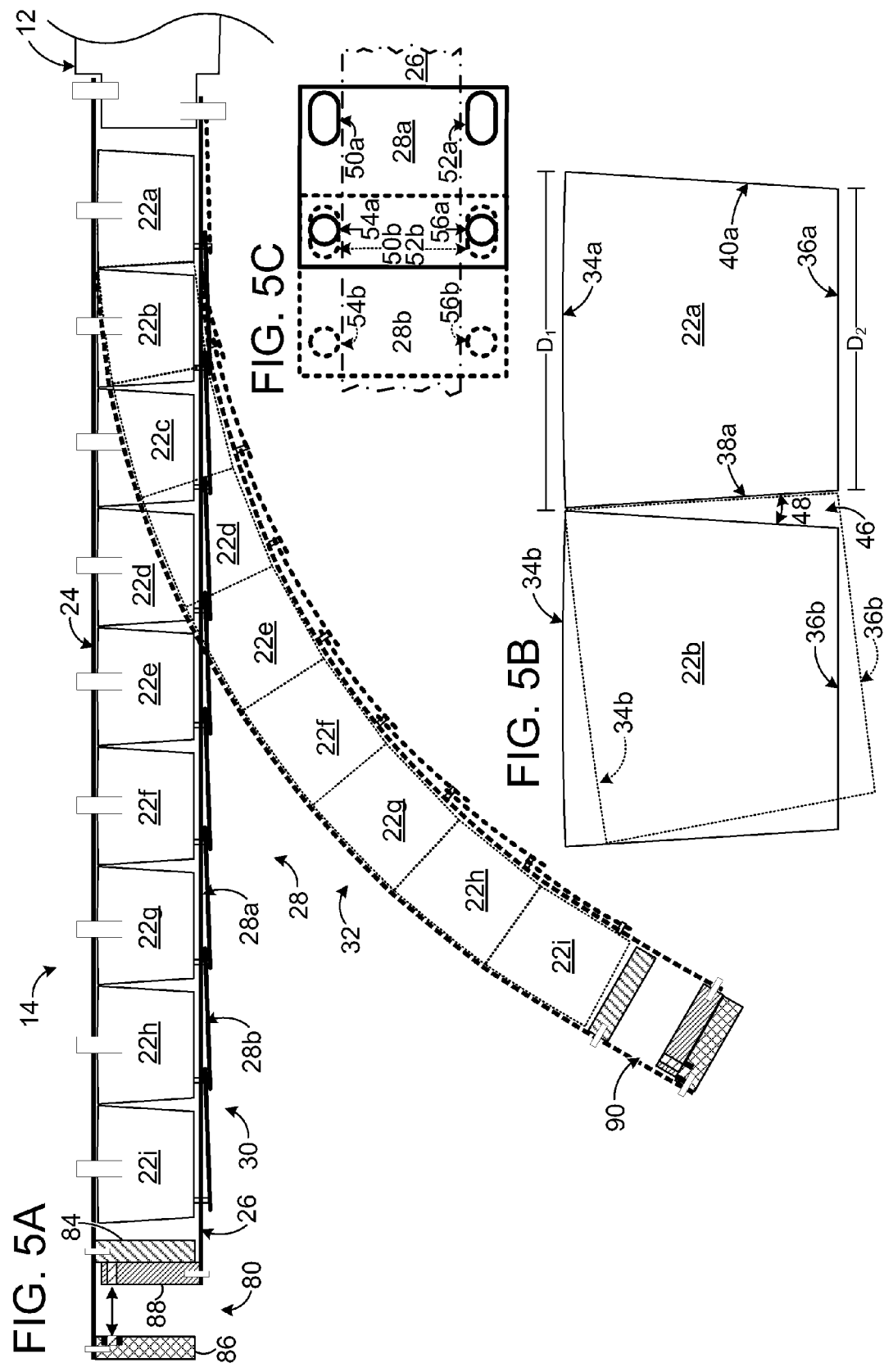

COMPUTER MOUSE SLEEVE

BACKGROUND

Computer mice are popular input devices for a variety of different types of computing systems. Most computer mice have a somewhat rotund body that some mobile computer users find less portable than desired.

SUMMARY

According to an aspect of this disclosure, a flexible sleeve for a device that is moveable between a curved configuration and a flat configuration is provided. The flexible sleeve includes a first flexible sheet of a first hardness. The first flexible sheet has a first perimeter including a first lip edge and a first pocket edge. The flexible sleeve also includes a second flexible sheet of a second hardness, different than the first hardness. The second flexible sheet has a second perimeter including a second lip edge and a second pocket edge. The second pocket edge is joined to the first pocket edge, and the second lip edge is free from the first lip edge so that the first flexible sheet and the second flexible sheet collectively form a pocket having a mouth defined by the first lip edge and the second lip edge. The flexible sleeve further includes a connector joined to the mouth and configured to mate the mouth to a head of the device while the pocket substantially covers a tail of the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5A schematically shows a cross section of the elongated rib members of the computer mouse of FIG. 1.

FIG. 5B schematically shows an enlarged view of example neighboring elongated rib members.

FIG. 5C schematically shows an enlarged view of example neighboring scales.

DETAILED DESCRIPTION

Figure 1:
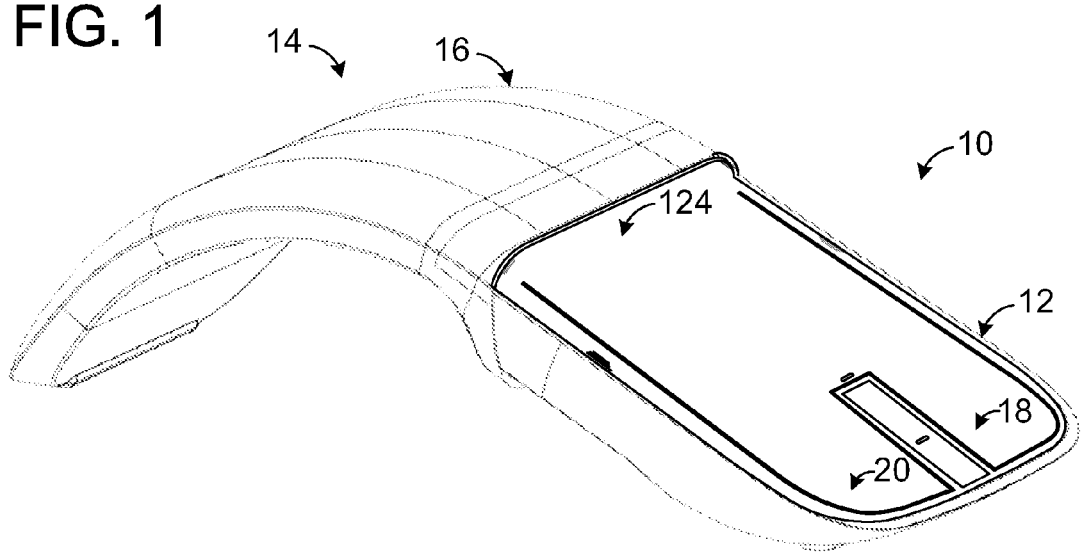
FIG. 1 schematically shows an example computer mouse in accordance with embodiments of the present disclosure.

FIG. 1 shows a computer mouse 10 including a head 12 and a tail 14. In FIG. 1, tail 14 is covered by a flexible sleeve 16.

Computer mouse 10 may be a portable device which is designed to detect movement relative to a reference surface, such as a desktop. Computer mouse 10 may communicate to a computer system the position of the mouse relative to the reference surface, so that a user may control the position of a cursor on a display device, for example. Computer mouse 10 includes a left button 18 and a right button 20. When a button is pressed, computer mouse 10 may communicate the button activation to the computer system, so that a user may make a selection, for example. While computer mouse 10 includes two buttons, it is to be understood that computer mice in accordance with the present disclosure may include more or fewer buttons. Furthermore, mice may include other types of controls, such as scroll wheels and/or track pads.

Computer mouse 10 may be selectively moveable between a curved configuration and a flat configuration. In particular, tail 14 can be changed from a substantially flat shape to a curved shape. The curved configuration provides a comfortable hand-fitting position that allows computer mouse 10 to be easily held and manipulated by a user.

Figure 2:
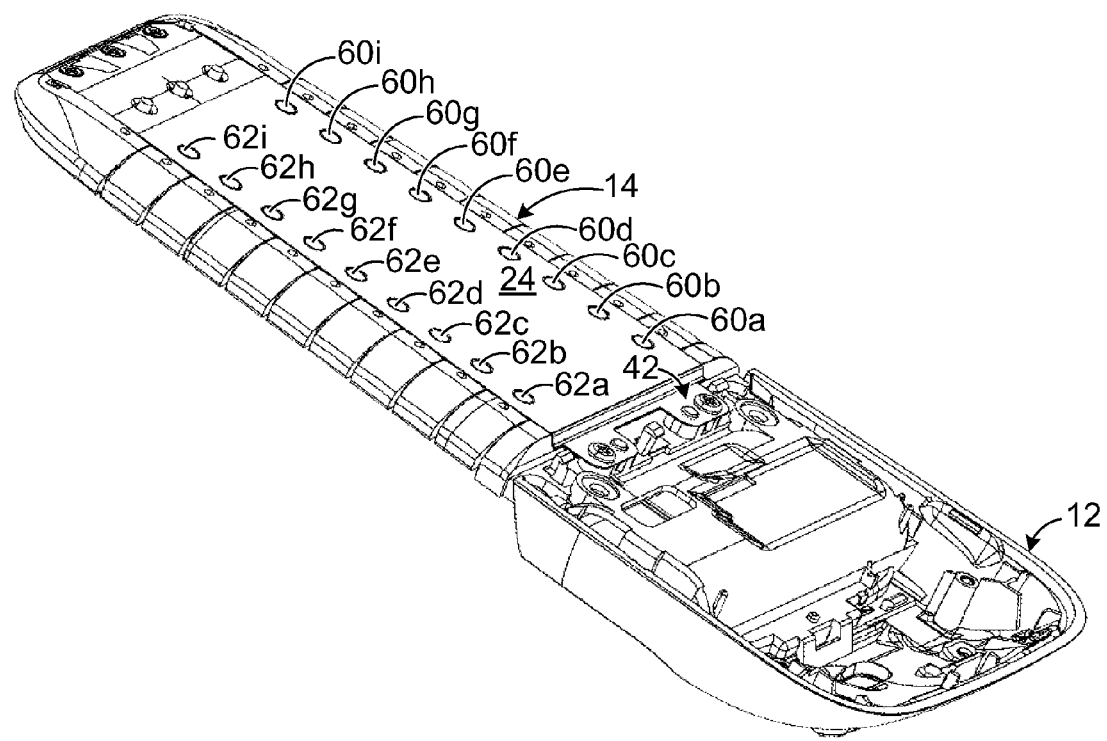
FIG. 2 schematically shows a top view of a portion of the computer mouse of FIG. 1 in a flat configuration without the flexible sleeve.
Figure 3:
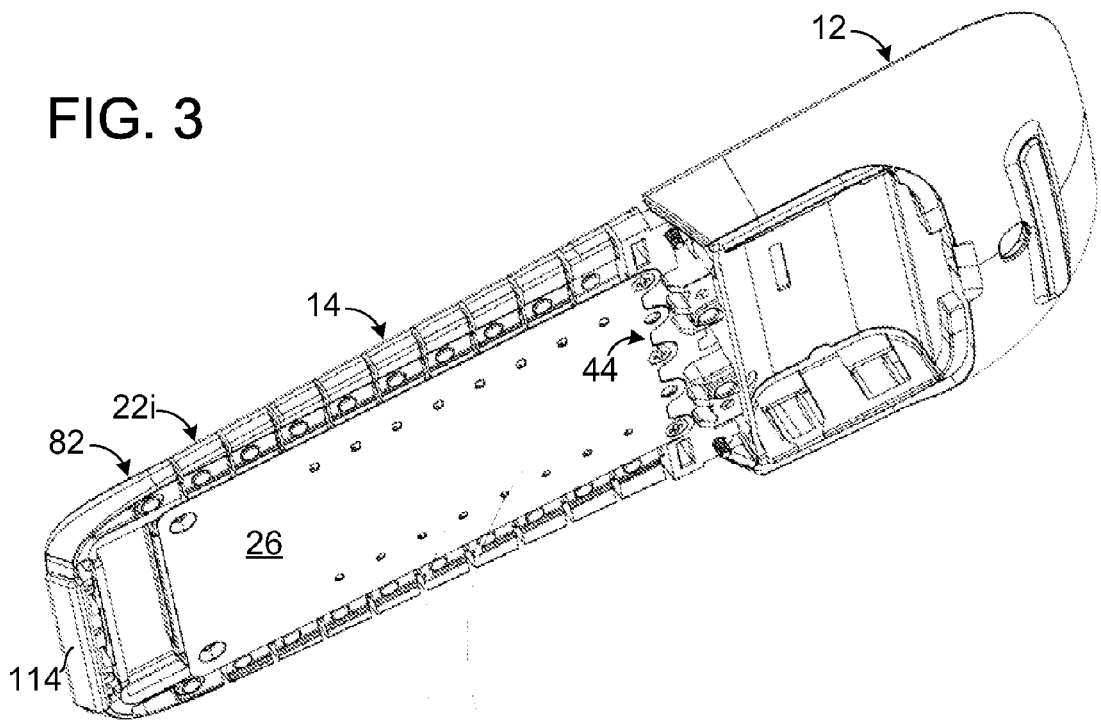
FIG. 3 schematically shows an underside view of the portion of the computer mouse of FIG. 2.

FIGS. 2 and 3 show portions of computer mouse 10 in a flat configuration without flexible sleeve 16. The flat configuration provides a portable position that allows computer mouse 10 to be easily stored and/or transported. For example, computer mouse 10 may more easily fit into a pocket when in the flat configuration. Furthermore, when in the flat configuration, computer mouse 10 may more easily fit into a pocket than a conventional mouse with a more full-bodied shape.

Figure 4A:
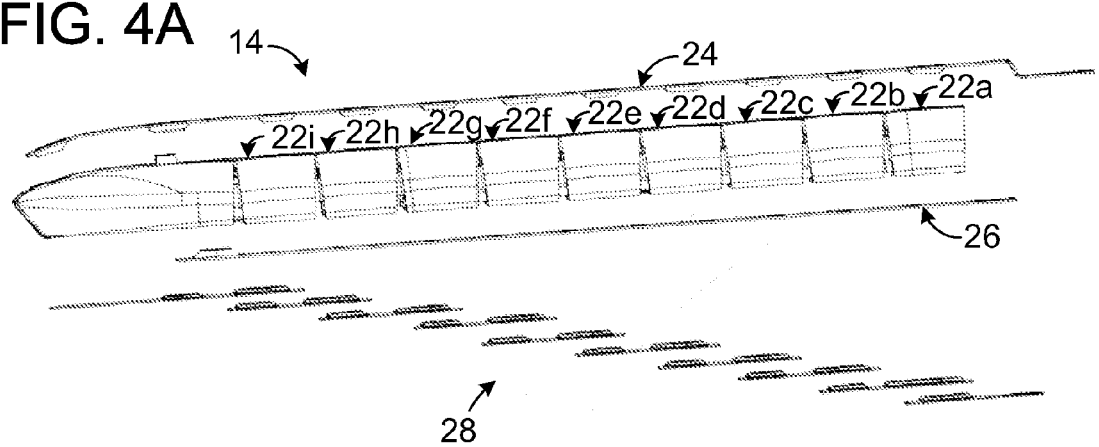
FIG. 4A schematically shows an exploded view of a tail of the computer mouse of FIG. 1.

FIG. 4A shows an exploded view of the tail 14. Tail 14 includes a plurality of elongated rib members 22a-22i, a top flexible support 24, a bottom flexible support 26, and a plurality of overlapping scales 28. The plurality of elongated rib members are disposed between the top and bottom flexible supports. The second flexible support is disposed between the plurality of overlapping scales and the plurality of elongated rib members.

In this example embodiment, there are nine elongated rib members. It will be appreciated that more or fewer ribs may be included in alternative embodiments. As depicted in FIGS. 2 and 3, each elongated rib member is longer across its longitudinal axis (i.e., across the width of the mouse) than across its latitudinal axis (i.e., from the front of the mouse to the back of the mouse). In the illustrated embodiment, each elongated rib member is at least four times longer across its longitudinal axis than across its latitudinal axis. However, other ratios may be used.

Figure 4B:
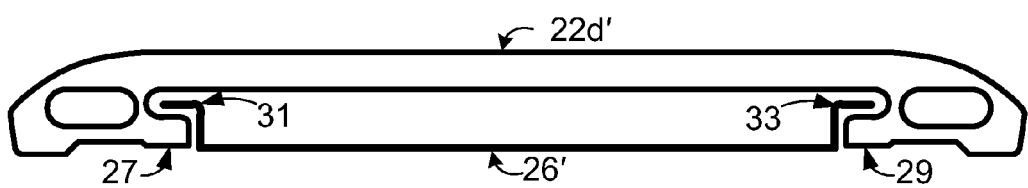
FIG. 4B schematically shows an example embodiment of an elongated rib member that mechanically interlocks with a bottom flexible support.

FIG. 4B schematically shows a cross section of an elongated rib member 22d' and bottom flexible support 26'. As shown in this example, the elongated rib members and/or the bottom flexible support may be configured to mechanically interlock. In this example, the elongated rib member includes a shelf 27 and a shelf 29, and the bottom flexible support includes a catch 31 and a catch 33. Shelf 27 is configured to engage catch 31 and shelf 29 is configured to engage catch 33. As such, elongated rib member 22d' is able to allow the bottom flexible support to slide relative to the elongated rib member without becoming separated from the elongated rib member when the tail is moved into the curved configuration. In other embodiments, a bottom flexible support may be connected to an intermediate catch, and the intermediate catch may interlock with a shelf of an elongated rib member to hold the bottom flexible support to the elongated rib member. While elongated rib member 22d' is used as an example, it is to be understood that other elongated rib members may be similarly configured.

FIG. 5A schematically shows a cross section of the elongated rib members 22a-22i. At 30, the elongated rib members are shown in the flat configuration, indicated with solid lines. At 32, the elongated rib members are shown in the curved configuration, indicated with dashed lines. FIG. 5B is an enlarged view of elongated rib member 22a and elongated rib member 22b.

Each elongated rib member may have a generally trapezoidal cross section. As shown with reference to elongated rib member 22a, the generally trapezoidal cross section is bounded by a top face 34a; a bottom face 36a; a left side 38a between top face 34a and bottom face 36a; and a right side 40a between top face 34a and bottom face 36a. As shown, the top face 34a opposes the bottom face 36a and the left side 38a opposes the right side 40a.

Top face 34a has a width $D_1$ and bottom face 36a has a width $D_2$. $D_1$ is greater than $D_2$, thus giving elongated rib member 22a a generally trapezoidal cross section. However, it is to be understood that one or more elongated rib members may not have perfect trapezoidal cross sections. For example, top face 34a and/or bottom face 36a may be curved, non-planar surfaces. As another example, corners between faces and sides may include bevels and/or rounded edges. These and other variations from a true trapezoidal cross section are within the scope of this disclosure.

In some embodiments, the cross section of each elongated rib member may be substantially identical to the cross sections of all other elongated rib members. In some embodiments, at least one elongated rib member may have a different size and/or shape when compared to another elongated rib member. In general, the size, shape, and number of elongated rib members can be selected to achieve a desired curved configuration, as described below by way of example.

FIG. 5A also shows a cross section of top flexible support 24 and bottom flexible support 26. Top flexible support 24 is attached to head 12 and to each elongated rib member. As shown in FIG. 2, a foremost end of top flexible support includes a connector 42 configured to join top flexible support 24 to head 12. In the illustrated embodiment, connector 42 includes four holes, which are complementary to four holes at a rearmost side of head 12, and which each receive a fastening member. In this example embodiment, two threaded screws and two rivets connect top flexible support 24 to head 12. In other embodiments, top flexible support 24 and head 12 may be attached by alternative means, such as studs, heat staking, or a clasp.

Turning back to FIG. 5A, bottom flexible support 26 is attached to the head of the mouse but is not attached to all of the elongated rib members. As shown in FIG. 3, a foremost end of bottom flexible support includes a connector 44 configured to join bottom flexible support 26 to head 12. In the illustrated embodiment, connector 44 includes five holes, which are complementary to five holes at a rearmost side of head 12, and which each receive a fastening member. In this example embodiment, three threaded screws and two rivets connect bottom flexible support 26 to head 12. In other embodiments, bottom flexible support 26 and head 12 may be attached by alternative means, such as studs or a clasp.

Turning back to FIG. 5A, top flexible support 24 is configured to hold the elongated rib members in a spatially consecutive arrangement and guide them between the flat configuration and the curved configuration. In the flat configuration, the top faces of neighboring elongated rib members may be in close proximity to one another. Furthermore, top flexible support 24 may maintain a substantially equal spacing between the top faces of neighboring elongated rib members because the top flexible support is connected to the top face of each elongated rib member.

In contrast, the bottom faces of neighboring elongated rib members may be spaced farther apart than the top faces when the tail is in the flat configuration. As an example, top face 34a is closer to top face 34b than bottom face 36a is to bottom face 36b. This arrangement forms a gap 46 between elongated rib member 22a and elongated rib member 22b. As can be seen in FIG. 5A, a similar gap exists between each pair of neighboring elongated rib members.

When in the flat configuration, gap 46 is characterized by an angle 48 with a magnitude $M_1$. When in the curved configuration, angle 48 has a magnitude $M_2$, which is less than $M_1$. In some embodiments, including the illustrated embodiment, the gap may essentially close when the mouse is moved into the curved configuration (e.g., angle 48≈0 degrees). Closing each gap between neighboring elongated rib members contributes to the overall curvature of tail 14 in the curved configuration.

FIG. 5A also shows overlapping scales 28. Each of overlapping scales 28 may be connected to a pair of neighboring elongated rib members at the bottom faces of the elongated rib members. However, each overlapping scale may be slideably connected to at least one of the pair of neighboring elongated rib members so that gap 48 may close. Such a connection may allow the mouse tail to move from the flat configuration to the curved configuration and prevent the mouse tail from moving into a configuration in which the mouse tail bends backwards (i.e., opposite the curved configuration).

FIG. 5C shows an enlarged view of neighboring overlapping scales—namely overlapping scale 28a (shown in solid lines) and overlapping scale 28b (shown in dashed lines). Overlapping scale 28a has a forward slotted left hole 50a and a forward slotted right hole 52a. Overlapping scale 28a also has a rearward fixed left hole 54a and a rearward fixed right hole 56a. Similarly, overlapping scale 28b has a forward slotted left hole 50b, a forward slotted right hole 52b, a rearward fixed left hole 54b, and a rearward fixed right hole 56b. Each overlapping scale may be configured similarly.

A fastener such as a rivet may attach neighboring overlapping scales to an elongated rib member. For example, a rivet may be fastened through holes 54a and 50b. Similarly, a rivet may be fastened through holes 56a and 52b. Such rivets may attach both overlapping scales to the same elongated rib member (e.g., elongated rib member 22g of FIG. 5A).

In such an arrangement, the fixed holes (e.g., hole 54a and hole 56a) may be sized to closely fit the rivet so that overlapping scale 28a does not slide relative to the elongated rib member. In contrast, the slotted holes (e.g., hole 50b and hole 52b) may be sized to allow fore and aft sliding relative to the elongated rib member. In this way, each overlapping scale can be fixed to one elongated rib member and may slide relative to another elongated rib members. As such, as the gaps between neighboring elongated rib members close as the tail moves from the flat configuration to the curved configuration the overlapping scales are able to accommodate the changing length of the bottom of the tail as the tail moves from the flat configuration to the curved configuration.

The bottom flexible support may slide between the holes and the rivets. Because the bottom flexible support is not attached to the elongated rib members, the bottom flexible support may also accommodate the changing length of the bottom of the tail as the tail moves from the flat configuration to the curved configuration.

The top flexible support, the bottom flexible support, and the plurality of overlapping scales may be comprised of thin sheets of a metal, such as steel. In alternative embodiments, the flexible supports and/or scales may be comprised of any material that is suitably flexible, strong, and durable. In some embodiments, one or more of the top flexible support, the bottom flexible support, and the overlapping scales may be made from plastic.

As depicted in FIG. 2, the top flexible support 24 includes a left side row of holes (i.e., hole 60a, hole 60b, hole 60c, hole 60d, hole 60e, hole 60f, hole 60g, hole 60h, hole 60i) and a right side row of holes (i.e., hole 62a, hole 62b, hole 62c, hole 62d, hole 62e, hole 62f, hole 62g, hole 62h, hole 62i) that extend along a longitudinal axis of the computer mouse 10. Each hole in the top flexible support may be complementary to a hole in the top face of an elongated rib member. The top flexible support may be attached to an elongated rib member at each pair of complementary holes. For example, a fastener, such as a rivet, may be used to attach the top flexible support to the elongated rib members at the complementary holes. In some embodiments, the top flexible support may be attached to elongated rib members via another suitable mechanism, such as via heat stakes and/or screws. Attaching each elongated rib member to the top flexible support at two separate locations may help limit the elongated rib members from twisting relative to one another.

Figure 6:
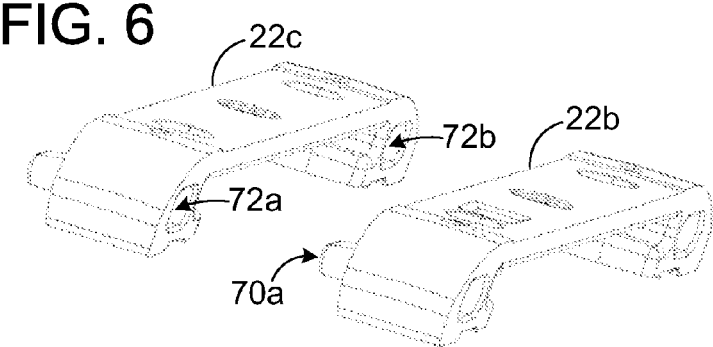
FIG. 6 schematically shows an example elongated rib member that includes a left projection and a right projection.

An elongated rib member may include one or more projections configured to mate with complementary cavities in a neighboring elongated rib member. For example, FIG. 6 shows an elongated rib member 22b that includes a left projection 70a and a right projection (not shown). The projections are configured to mate with complementary left cavity 72a and right cavity 72b of neighboring elongated rib member 22c. The mating of the projections into complementary cavities may further help limit the elongated rib members from twisting relative to one another. The cavities may be sized so as to accommodate more complete entry of the projections as the tail moves from the flat configuration to the curved configuration.

Turning back to FIG. 5A, tail 14 includes latch 80. Latch 80 may be configured to provide a straightening force to bias the plurality of elongated rib members in the flat configuration when the plurality of elongated rib members are in the flat configuration. Latch 80 may also be configured to provide a bending force to bias the plurality of elongated rib members in the curved configuration when the plurality of elongated rib members are in the curved configuration. In other words, when the mouse is in the flat configuration, latch 80 may work to prevent the mouse from being moved into the curved configuration; and when the mouse is in the curved configuration, latch 80 may work to prevent the mouse from being moved into the flat configuration. In this way, the mouse is less likely to accidentally be moved from the flat configuration to the curved configuration or vice versa. A strength of the biasing forces provided by the latch may be set so as to prevent accidental movement from one configuration to the other while at the same time allowing purposeful movement from one configuration to the other. In some embodiments, the biasing forces may be unequal, such that the tail may be moved from the flat configuration to the curved configuration relatively easier than from the curved configuration to the flat configuration, for example.

Latch 80 may be located within one or more elongated rib members and/or other portions of the mouse. Briefly turning back to FIG. 3, a latch may be housed in an elongated end piece 82 and/or one or more elongated rib members (e.g., elongated rib member 22i) proximate to elongated end piece 82.

Turning back to FIG. 5A, latch 80 is a magnetic latch. While a magnetic latch is provided as a nonlimiting example of a suitable latch, it is to be understood that other latches may be used without departing from the scope of this disclosure. In the illustrated embodiment, latch 80 includes a front magnetic partner 84 and a rear magnetic partner 86 that are each attached to top flexible support 24. Latch 80 also includes an intermediate magnetic partner 88 attached to bottom flexible support 26. Intermediate magnetic partner 88 is disposed between front magnetic partner 84 and rear magnetic partner 86.

In general, the front magnetic partner and the rear magnetic partner are made of one or more materials that are magnetically attracted to the one or more materials from which the intermediate magnetic partner is made. As one example, the front magnetic partner and the rear magnetic partner may be iron that is not permanently magnetic, and the intermediate magnetic partner may be a permanent magnet (e.g., ferromagnetic iron). As another example, the front magnetic partner and the rear magnetic partner may be a permanent magnet (e.g., ferromagnetic iron), and the intermediate magnetic partner may be iron that is not permanently magnetic. It is to be understood that any combination of magnetically attractive partners may be used.

When computer mouse 10 is in the flat configuration, front magnetic partner 84 and intermediate magnetic partner 88 magnetically bias the plurality of elongated rib members in the flat configuration. In particular, front magnetic partner 84 and intermediate magnetic partner 88 magnetically attract one another. When computer mouse 10 moves from the flat configuration to the curved configuration, intermediate magnetic partner 88 moves away from front magnetic partner 84 towards rear magnetic partner 86 because the inner radius of the bottom flexible support is less than the outer radius of the top flexible support. As such, the magnetic force between front magnetic partner 84 and intermediate magnetic partner 88 works to prevent the mouse from moving from the flat configuration to the curved configuration.

When computer mouse 10 is in the curved configuration, rear magnetic partner 86 and intermediate magnetic partner 88 magnetically bias the plurality of elongated rib members in the curved configuration. In particular, rear magnetic partner 86 and intermediate magnetic partner 88 magnetically attract one another. When computer mouse 10 moves from the curved configuration to the flat configuration, intermediate magnetic partner 88 moves away from rear magnetic partner 86 towards front magnetic partner 84 because the inner radius of the bottom flexible support is less than the outer radius of the top flexible support. As such, the magnetic force between rear magnetic partner 86 and intermediate magnetic partner 88 works to prevent the mouse from moving from the curved configuration to the flat configuration.

Computer mouse 10 may automatically switch into an off-state when in the flat configuration and into an on-state when in the curved configuration. When in the on-state, computer mouse 10 may use battery or other power to detect and report movement relative to a reference surface, detect and report button activations, etc. When in the off-state, such functionality may be suspended and battery usage may be decreased or eliminated.

One non-limiting example of a switch 90 is shown in FIG. 5B. In this example, switch 90 is incorporated into the components of latch 80. In this nonlimiting example, a first contact is mounted to intermediate magnetic partner 88. A complimentary contact is mounted to rear magnetic partner 86. In the curved configuration, wherein the rear magnetic partner and the intermediate magnetic partner are proximate, an electrical circuit may be closed by touching of the first and second contacts. The closed circuit may be used as a switch to turn the computer mouse on. Continuing with this nonlimiting example, in the flat configuration, wherein the front magnetic partner and the intermediate magnetic partner are proximate, the first contact and the second contact do not touch and the electrical circuit is open. The open circuit may be used as a switch to turn the computer mouse off.

Figure 7:
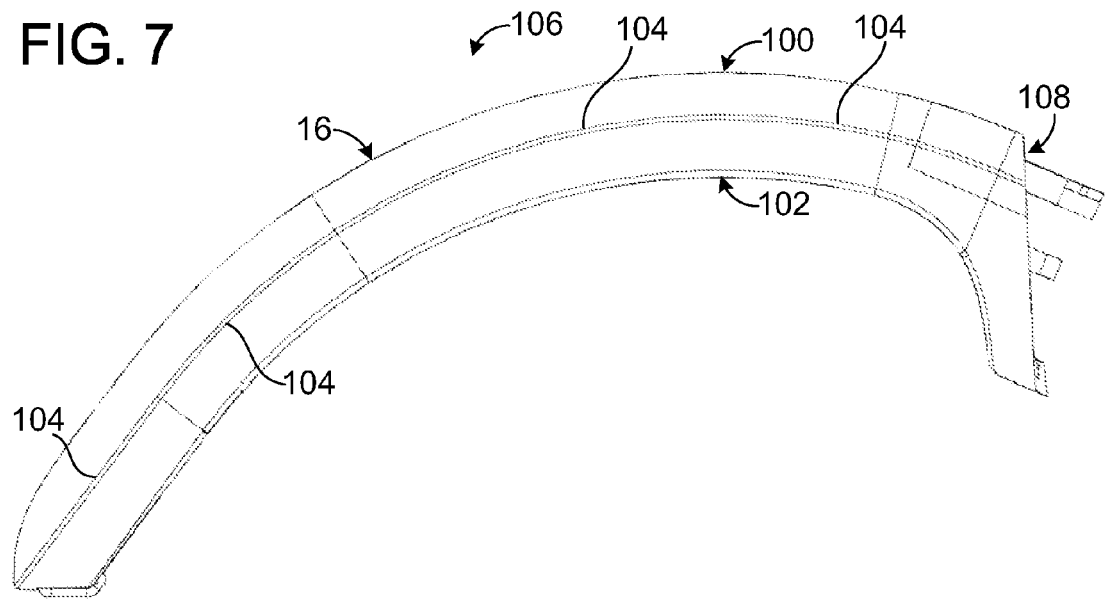
FIG. 7 schematically shows a profile view of the flexible sleeve of the computer mouse of FIG. 1.
Figure 8:
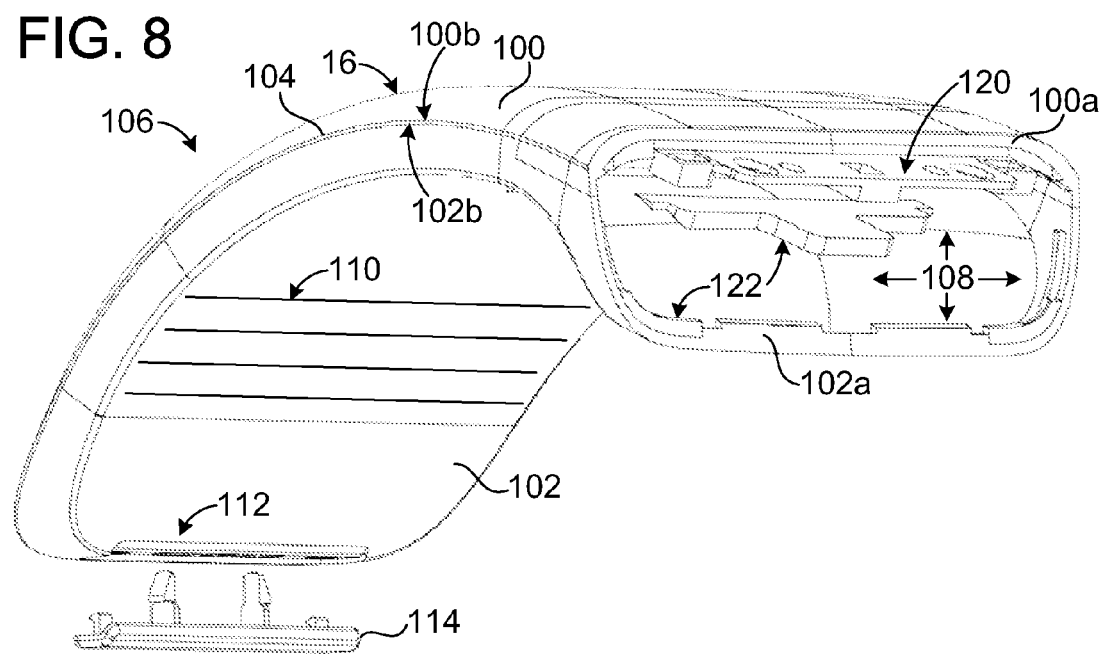
FIG. 8 schematically shows another view of the flexible sleeve of FIG. 7.

FIG. 7 shows a profile of flexible sleeve 16. Flexible sleeve 16 is comprised of a top flexible sheet 100 and a bottom flexible sheet 102. As shown in FIG. 8, the top flexible sheet 100 may have a first perimeter, including a first lip edge 100a and a first pocket edge 100b. The bottom flexible sheet 102 may have a second perimeter, including a second lip edge 102a and a second pocket edge 102b, complementary to the first lip edge 100a and the first pocket edge 100b, respectively. The first pocket edge 100b and the second pocket edge 102b may be joined at a seam 104. When joined in this manner, the top flexible sheet and the bottom flexible sheet collectively form a pocket 106. The first lip edge 100a and the second lip edge 102a may be unjoined and collectively form a mouth 108 of the pocket 106. As shown in FIG. 1, flexible sleeve 16 may substantially cover tail 14 when tail 14 is inserted through mouth 108 into pocket 106.

The top flexible sheet may be relatively harder than the bottom flexible sheet. The relatively greater hardness of the top flexible sheet may improve durability of the top surface of the sleeve, which may be more frequently handled by a user. The relatively greater hardness of the top flexible sheet may also provide a relatively smoother and more aesthetically attractive appearance to the top surface of the sleeve, which may be more frequently viewed by a user. The relatively lesser hardness of the bottom flexible sheet may provide better flexibility to the bottom surface of the sleeve, which flexes from a tighter radius of curvature than the top flexible sheet.

In some embodiments, top flexible sheet 100 may be comprised of a first silicone having a Shore A Durometer between 45-60. For example, top flexible sheet may be comprised of a silicone having a Shore A Durometer of 52. In some embodiments, bottom flexible sheet 102 may be comprised of a second silicone having a Shore A Durometer between 30-40. For example, bottom flexible sheet may be comprised of a silicone having a Shore A Durometer of 35.

As shown in FIGS. 7 and 8, flexible sleeve 16 is curved in a relaxed state, and therefore may bias tail 14 to the curved configuration. Accordingly, flexible sleeve 16 may be in a flexed state in the flat configuration.

As shown in FIG. 8, bottom flexible sheet 102 includes a plurality of ridges 110. Ridges 110 may facilitate stretching and flexing of the bottom flexible sheet as the sleeve move from the curved configuration to the flat configuration and vice versa.

Flexible sleeve 16 may include a plurality of holes 112 at a rearward end of the sleeve. Such holes may be complementary to a plurality of holes (not shown) in elongated end piece 82 (shown in FIG. 3). A foot member 114 may be inserted through holes 112 in order to secure the position of flexible sleeve 16 relative to elongated end piece 82. Foot member 114 may be comprised of one or more hard materials, such as plastic or metal, and may provide a smooth hard area that is easily slid across a surface during operation of the computer mouse 10.

Mouth 108 is located at an opposing end of the flexible sleeve relative to foot member 114. Mouth 108 may be configured to receive tail 14 and attach flexible sleeve 16 to head 12. The mouth may include one or more connectors configured to mate with the head 12. The connector(s) may be any suitable material(s). For example, the connectors may be comprised of a metal, such as zinc, and/or a plastic. The connector(s) may be co-molded or otherwise joined to mouth 108.

The connector(s) may include top and/or bottom fastening locations that allow the flexible sleeve to be attached to head 12. In the example illustrated in FIG. 8, a top connector 120 includes four top holes, through which screws, rivets, or other fasteners can secure the connector to head 12. In the illustrated example, a bottom connector 122 includes a supporting plate. A bottom connector may optionally include screw guides configured to receive screws from above, which may be tightened to draw the bottom connector against head 12.

The connectors may be substantially if not completely hidden when the flexible sleeve is attached to head 12. In some embodiments, a cover (e.g., cover 124 in FIG. 1) including the mouse buttons may at least partially overlap top connector 120 and hide how the top connector is fastened to the head. In some embodiments, screws or other fasteners may connect to bottom connector 122 from above, and such screws or other fasteners may also be hidden by cover 124.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A flexible sleeve for a device that is moveable between a curved configuration and a flat configuration, the flexible sleeve comprising:
    a first flexible sheet of a first hardness, the first flexible sheet having a first perimeter including a first lip edge and a first pocket edge;
    a second flexible sheet of a second hardness, different than the first hardness, the second flexible sheet having a second perimeter including a second lip edge and a second pocket edge, the second pocket edge joined to the first pocket edge, and the second lip edge free from the first lip edge so that the first flexible sheet and the second flexible sheet collectively form a pocket having a mouth defined by the first lip edge and the second lip edge;
    a connector joined to the mouth and configured to mate the mouth to a head of the device while the pocket substantially covers a tail of the device.

2. The flexible sleeve of claim 1, where the pocket is configured to flex from a relaxed curved state to an unrelaxed flat state as the device moves from the curved configuration to the flat configuration, such that the pocket is configured to bias the device toward the curved configuration.

3. The flexible sleeve of claim 1, where the first flexible sheet of the first hardness is comprised of a first silicone and the second flexible sheet of the second hardness is comprised of a second silicone different than the first silicone.

4. The flexible sleeve of claim 1, where a Shore A Durometer of the first flexible sheet is greater than a Shore A Durometer of the second flexible sheet.

5. The flexible sleeve of claim 4, where the first flexible sheet has a Shore A Durometer of 45-60.

6. The flexible sleeve of claim 4, where the first flexible sheet has a Shore A Durometer of 52.

7. The flexible sleeve of claim 4, where the second flexible sheet has a Shore A Durometer of 30-40.

8. The flexible sleeve of claim 4, where the second flexible sheet has a Shore A Durometer of 35.

9. The flexible sleeve of claim 1, where in the curved configuration the first flexible sheet has a larger radius of curvature than the second flexible sheet.

10. The flexible sleeve of claim 1, where the second flexible sheet includes a plurality of ridges.

11. The flexible sleeve of claim 1, where the first flexible sheet and the second flexible sheet are co-molded at the first pocket edge and the second pocket edge.

12. The flexible sleeve of claim 1, where the pocket includes a plurality of holes configured to receive a foot member.

13. A computer mouse, comprising:
- a head for detecting movement relative to a reference surface;
- a flexible sleeve including a mouth for mating to the head; and
- a tail including a top, a bottom, and opposing sides cooperatively formed from a plurality of elongated rib members independently pivotable relative to adjacent elongated rib members, the tail connected to the head and substantially sheathed by the flexible sleeve when the flexible sleeve is mated to the head such that the sleeve substantially covers the top, bottom, and opposing sides of the tail, the tail and the flexible sleeve mutually moveable between a curved configuration and a flat configuration.

14. The computer mouse of claim 13 wherein the flexible sleeve includes:
- a first flexible sheet of a first hardness, the first flexible sheet having a first perimeter including a first lip edge and a first pocket edge;
- a second flexible sheet of a second hardness, different than the first hardness, the second flexible sheet having a second perimeter including a second lip edge and a second pocket edge, the second pocket edge joined to the first pocket edge, and the second lip edge free from the first lip edge so that the first flexible sheet and the second flexible sheet collectively form a pocket having a mouth defined by the first lip edge and the second lip edge;
- a connector joined to the mouth and configured to mate the mouth to a head of the device while the pocket substantially covers the tail.

15. The computer mouse of claim 14, where the pocket is configured to flex from a relaxed curved state to an unrelaxed flat state as the tail moves from the curved configuration to the flat configuration, such that the pocket is configured to bias the tail toward the curved configuration.

16. The computer mouse of claim 14, where the first flexible sheet of the first hardness is comprised of a first silicone and the second flexible sheet of the second hardness is comprised of a second silicone, the second silicone different than the first silicone.

17. The computer mouse of claim 14, where a Shore A Durometer of the first flexible sheet is greater than a Shore A Durometer of the second flexible sheet.

18. The computer mouse of claim 14, where in the curved configuration the first flexible sheet has a larger radius of curvature than the second flexible sheet.

19. A computer mouse, comprising:
- a head for detecting movement relative to a reference surface;
- a tail connected to the head, the tail moveable between a curved configuration and a flat configuration; and
- a flexible sleeve including a mouth for receiving the tail and mating to the head, the flexible sleeve configured to substantially cover the tail and including:
  a first flexible sheet of a first hardness, the first flexible sheet having a first perimeter including a first lip edge and a first pocket edge;
  a second flexible sheet of a second hardness, different than the first hardness, the second flexible sheet having a second perimeter including a second lip edge and a second pocket edge, the second pocket edge joined to the first pocket edge, and the second lip edge free from the first lip edge so that the first flexible sheet and the second flexible sheet collectively form a pocket having a mouth defined by the first lip edge and the second lip edge;
  a connector joined to the mouth and configured to mate the mouth to the head while the pocket substantially covers the tail.

20. The computer mouse of claim 19, where a Shore A Durometer of the first flexible sheet is greater than a Shore A Durometer of the second flexible sheet.

* * * * *